United States Patent [19]

Britting et al.

[11] Patent Number: 4,602,427
[45] Date of Patent: Jul. 29, 1986

[54] SKEW SETTING MECHANISM FOR ROTOR ASSEMBLY MACHINE

[75] Inventors: Daniel M. Britting, Lowell; David R. Lamp, Rogers, both of Ark.

[73] Assignee: Artran Automation, Inc., Rogers, Ark.

[21] Appl. No.: 756,711

[22] Filed: Jul. 19, 1985

[51] Int. Cl.⁴ ............................................. H02K 15/02
[52] U.S. Cl. ........................................ 29/732; 29/598; 29/738
[58] Field of Search ............... 29/732, 736, 738, 598, 29/609

[56] References Cited

U.S. PATENT DOCUMENTS 4,400,872  8/1983  Berges ................................. 29/598

Primary Examiner—Carl E. Hall
Attorney, Agent, or Firm—Robert R. Keegan

[57] ABSTRACT

A rotor assembly machine which transports electric motor rotor laminates from a conveyor to a skewing nest where slots in the laminates are engaged by a plurality of vertical skew blades having a composite structure with two slightly separated spring steel vanes. The reduced width of the slot when the laminates are skewed is accommodated by the vanes of the skew blade flexing together. A particularly novel skew setting mechanism causes the skew blades to be tilted at a predetermined angle which is adjustable by varying the vertical distance between a higher fulcrum member and a lower blade pivot which rotated a predetermined angle causing the laminates to be skewed by an angle inversely related to the distances between the pivot and fulcrum, which distances in a multi-station machine may be separately adjusted thereby producing rotors from different stations with different skew angles. Press means inserts a dummy pin to hold the laminates in position and the lower end of the blades is moved radially outward to release the rotor assemblies out the bottom of the skewing nest.

20 Claims, 15 Drawing Figures

SKEW SETTING MECHANISM FOR ROTOR ASSEMBLY MACHINE

The present invention relates to electric motor rotor lamination assembly machines which receive individually stamped rotor laminations and causes them to be stacked with their holes concentric and with a predetermined skew angle for the slots of the laminations. The rotor assembly is then customarily held together by staking a dummy pin in the center hole or by other means. From the rotor assembly machine the rotors are conveyed to further processing steps to produce a rotor armature; these further steps are not relevant to the present invention. Although the specific embodiment of the apparatus disclosed herein is limited to production of electric motor rotor lamination assemblies, the novel skew setting mechanism could be adapted to assembly of other components where a skew angle is to be imparted in a substantially cylindrical stack of metal laminations.

The present invention more particularly relates to the apparatus and method for setting the rotor skew angle which is adjustable over a wide range of angles independently of the rotor height. An automated rotor assembly machine can and often does have multiple stations operating simultaneously to assemble electric motor rotors and the present invention permits several stations to have independently set skew angles under computer control thereby giving the capability of producing rotors with different skew angles in parallel operations. Different rotor heights can also be produced simultaneously but that aspect of the machine does not form part of the present invention.

An assembly nest according to the invention has a plurality (typically three) skew blades arranged around the cavity of the nest. When the laminations are loaded into the nest the skew blades are vertical and engage respective slots of each lamination. When the blades are vertical the plane of the blades passes through the central vertical axis of the lamination stack. A cylindrical plunger mounted in the assembly nest holds the bottom of each respective skew blade; the plunger is rotatable about a horizontal axis passing through the central vertical axis of the assembly nest and it is also translatable parallel to to its axis to move the bottom of the skew blade outwardly in the ejection step at the end of the assembly process.

The skew blade is pivotally connected with a horizontal pivot axis transverse to the plunger axis at its bottom end thereby allowing the bottom of the skew blade to tilt out during the ejection process. During the lamination loading operation the top of the skew blade is clamped to maintain the blade in a vertical position. At other times the clamp is released and the vertical orientation of the skew blade is modified by virtue of the engagement of an intermediate part of the skew blade by a fulcrum in the form of a slot in a fulcrum plate. The position of the vane relative to the fulcrum is maintained by a pin on the fulcrum plate which engages a generally vertical longitudinal slot in the skew blade.

The skew drive plate in which the plunger is mounted is arranged so that it can be rotated about a vertical axis through a predetermined angle which causes the skew blade to depart from vertical and causes a corresponding skew in the laminations by virtue of the engagement of the lamination slots by the skew blade. In the apparatus according to the invention the angular shift of the skew drive plate is fixed and the adjustability of the skew angle is attained by arranging the fulcrum plate so that it can be raised and lowered and thereby vary the distance between the longitudinal axis of the plunger at the botoom of the blade and the fulcrum engagement point at an intermediate portion of the blade. Specifically the non-rotatable fulcrum plate is threadedly engaged with a concentric cylinder which is rotatable to move the fulcrum up and down relative to the pivot plunger. The fulcrum cylinder is rotated through a gearing arrangement by an electric motor and digital positioning feed-back is provided to the computer which is directly proportional to the height of the fulcrum plate.

The ability to provide widely varying skew angles is enhanced by the design of the skew blades which are of composite construction. Each blade consists of two pieces of spring steel and an intermediate member with a combined thickness of ten to twenty percent less than the width of the rotor lamination slot. The intermediate member acts as a spacer and only the two outermost vanes extend into the region of lamination slot engagement. As the skew angle increases stair-stepping of the laminations occurs and the clearance for the skew blade diminishes. However, the skew blade thickness has a capacity of compressing by approximately thirty percent. This makes it possible to set greater skew angles without unacceptable binding of the skew blade in the lamination slot and with minimal wear on the skew blade.

After the desired skew angle has been set for the laminations they are secured in place by a dummy pin inserted through the central hole in the laminations and staked or otherwise secured in position. The rotors are unloaded from the bottom of the assembly nest by moving radially outward the bottom of the skew blades with the plunger to which they are pivoted. The fulcrum is located above the highest position of the lamination stack to ensure complete disengagement of the skew blade from the laminate slots. The composite flexible skew blade readily disengages from the slots through the action of the plunger notwithstanding the tilt of the skew blades in the skewed lamination slots. This frees the rotor to be lowered out of the assembly nest and ejected onto a conveyor for transport to the next workstation.

With the assembly nest according to the present invention the skew setting operation is automated to the extent that numerous adjustments may be made automatically by actuation of fluid pressure cylinders or electric motors with the result that electrical signals from a computer control system can completely control the operation including the determination of skew angles, the height of the lamination stack, the number of rotors of a particular configuration to be assembled, and the process can be controlled to make either the same or different types of rotors in each of a plurality of (for example four) stations on one machine.

Previous rotor assembly machine skew setting mechanisms did not have the capability of automatic control that is exhibited by the present invention. Some examples of previous rotor assembly machines are shown in the following U.S. Pat. Nos.:

4,400,872 to Berges, Aug. 30, 1983, Method of and Apparatus for Skewing a Stack of Laminations;

4,383,356 to Fichtner, May 17, 1983, Method and Apparatus for the Production of Rotor and Stator Sheet Packets for Electrical Machines;

3,802,068 to Scott, Apr. 9, 1974, Method of Making a Rotor;

3,344,514 to Partlow Et al, Oct. 3, 1967, Method of Skewing and Securing Stacked Rotor Laminations.

The Partlow Et al patent describes an arrangement for skewing and securing laminations which is capable of a diversity of skewing patterns, but must be set up in advance by configuring a plurality of shims in an array forming a vertical stack so that the edges of the shams are configured to the desired angle or pattern for the lamination skew. Obviously the skew angle and other variables are not subject to computer control in such an arrangement. The Scott patent specifically does not rely on aligning rods or aligning blades and requires that there be extending tabs from the laminations which are manipulated by tab aligning guides having slots which engage the tabs. This arrangement has limitations in terms of the degree of skew angle, the variation in the height of the stack and other limitations which are not possessed by the apparatus of the invention.

In the patent to Fichtner any skew angle must be achieved by causing aligning pins to be bent in a helical shape; thus changing the skew angle would require changing the aligning pins manually so that computer control of the skew angle would not be achievable. The apparatus of Berges has skewing pins which pivot to establish the skew angle but the means for pivoting the pins is such that electronic control of the skew angle is not contemplated, or in fact possible. The prior rotor assembly apparatus exemplified in the above patents also has other short-comings, in particular a general difficulty in achieving large skew angles and also difficulty in accommodating lamination stacks of different heights.

In addition to providing the above-described features and advantages it is an object of the present invention to provide an automated rotor lamination assembly apparatus for electric motor rotors or the like wherein the skew setting mechanism includes a pivot for allowing tilt of the blade from the vertical and a fulcrum for setting the blade tilt which has an adjustable vertical displacement from the pivot whereby the tilt angle is the function of the vertical displacement of the fulcrum from the pivot.

It is another object of the present invention to provide automated apparatus for assembly of electric motor rotor laminations with an assembly nest wherein the laminations are maintained with their center holes concentric while skew blades engaging slots in the laminations are moved from a vertical orientation to a tilted orientation by a screw drive plate having a fixed rotational displacement.

It is still another object of the present invention to provide rotor lamination assembly apparatus including an assembly nest with at least three skew blades disposed around the periphery thereof; said blades being made up of two spaced vanes of spring steel material whereby the vanes fit in slots in the rotors while in a vertical position without compression and as the vane is tilted and stair-stepping narrows the slot for the blade the vanes are compressed thereby permitting a greater angle of skew while maintaining accuracy for all angles.

Other objects and advantages of the present invention will be apparent from consideration of the following description in conjunction with the appended drawings in which.

Figure 12:
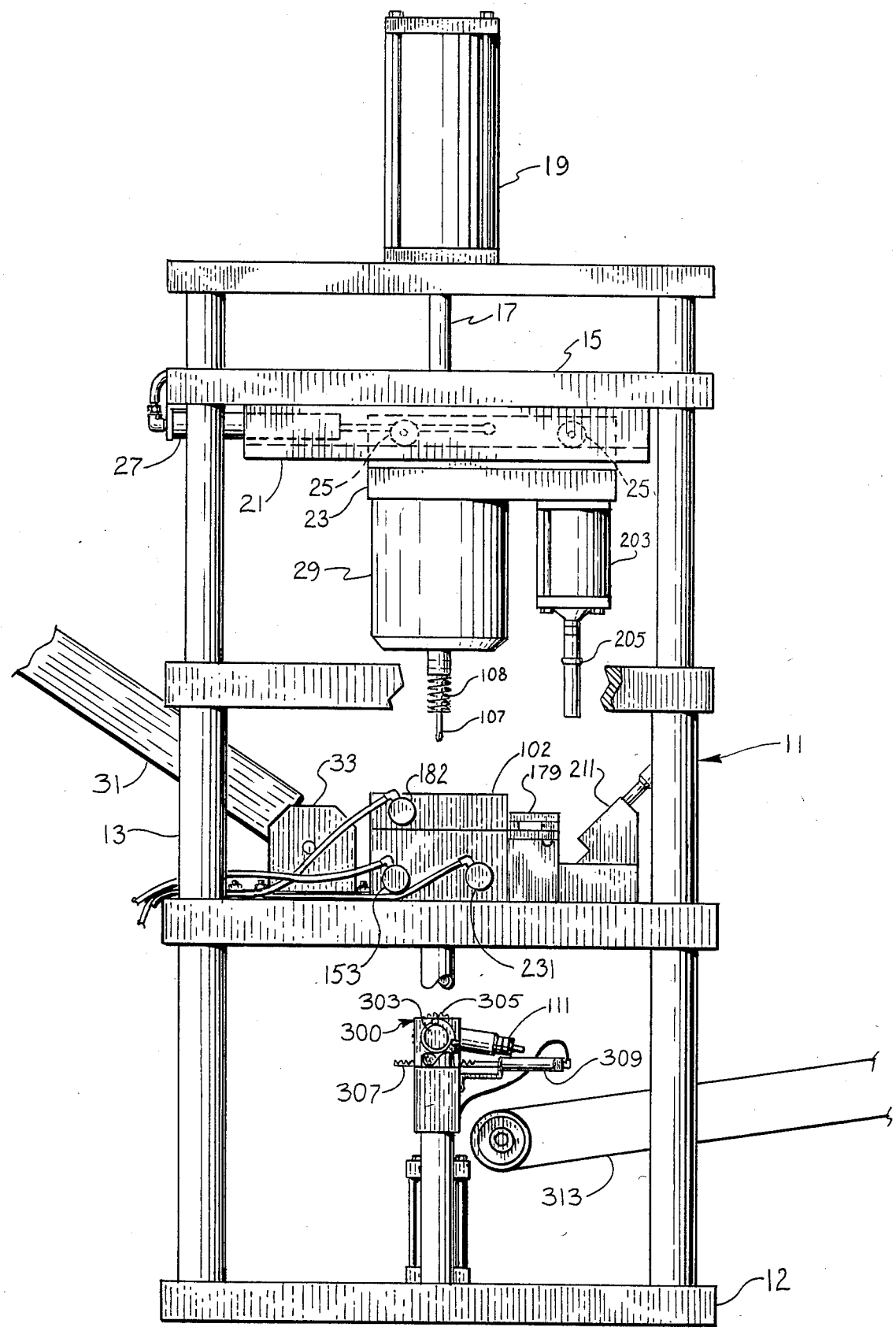
FIG. 12 is a front elevational view of rotor lamination assembly apparatus incorporating the invention.
Figure 13:
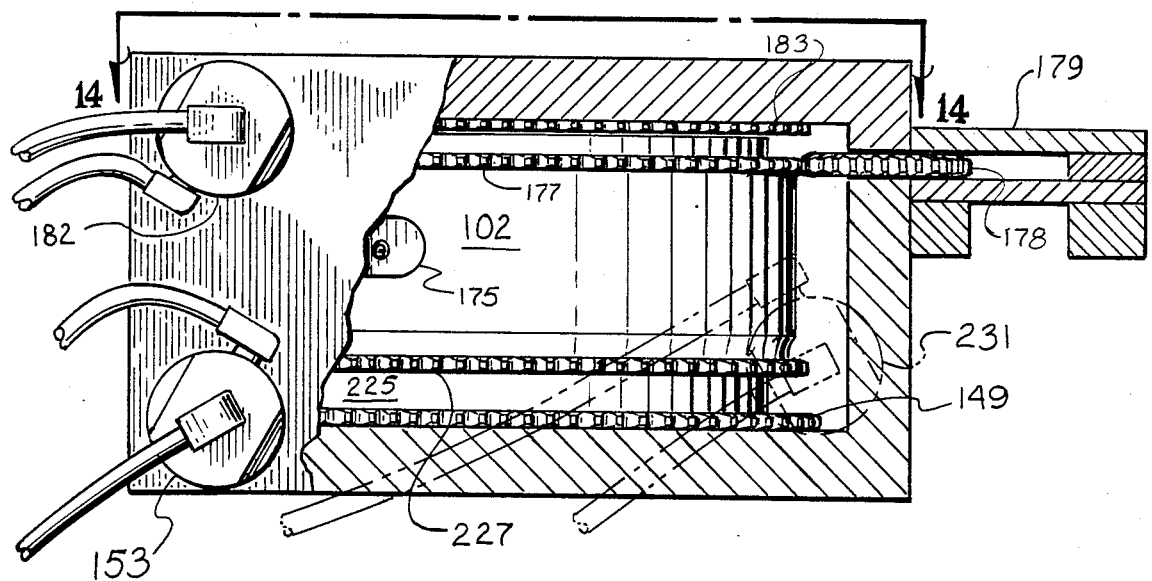
FIG. 13 is an external elevational view of the assembly nest partly broken away to show gear actuation mechanism for rotating elements of the assembly nest.

Referring now to the drawings and particularly to FIG. 12, a rotor assembly machine 11 having a base 12 and a frame 13 which includes a vertical transport plate 15 operated by shaft 17 of cylinder 19. A horizontal transport track 21 supports a carriage 23 supported movably by rollers 25. Carriage 23 is moved to either of two terminal positions by fluid pressure cylinder 27 or other suitable means. Carriage 23 is shown in its right-most position in FIG. 12.

Secured to carriage 23 is a lamination transport unit 29. Transport unit 29 contains the operating mechanism for pickup probe 107 which does not form part of the present invention.

Carriage 23 also has mounted thereon a staking press 203 having a staking press head 205. After the laminations have been given the proper skew setting in assembly nest 102 staking press 203 inserts a dummy pin in the central hull of the laminations and stakes the laminations to hold the pin in place, the dummy pin is picked up from pin feed mechanism 211 which does not form part of the present invention.

Laminations are fed to the machine from a lamination magazine 31 and are stacked in a lamination stacker 33, neither of which form a part of the present invention. Mounted on base 12 is a release and ejection mechanism 300 which will later be described; its function is to release and eject assembled rotors to conveyor 313 to transport them to a succeeding workstation or holding bin.

Figure 1:
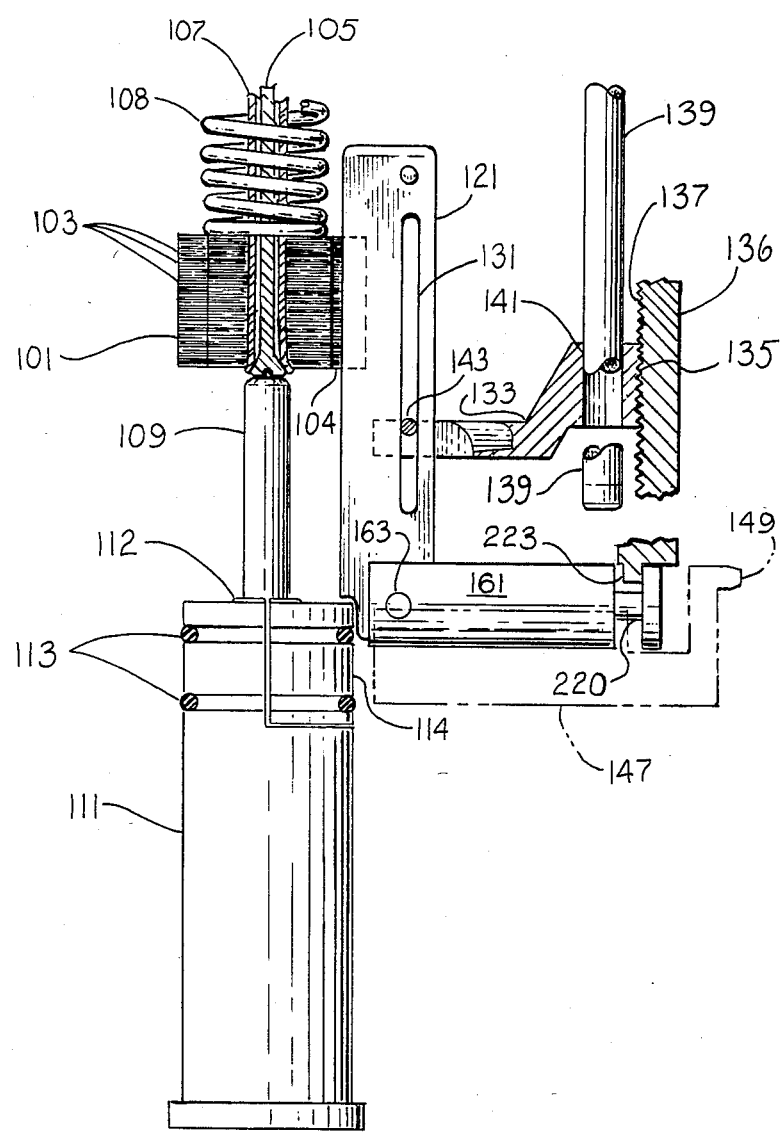
FIG. 1 is an elevational fragmentary view of the skew setting mechanism according to the present invention broken away to show the major operating elements of the mechanism.
Figure 2:
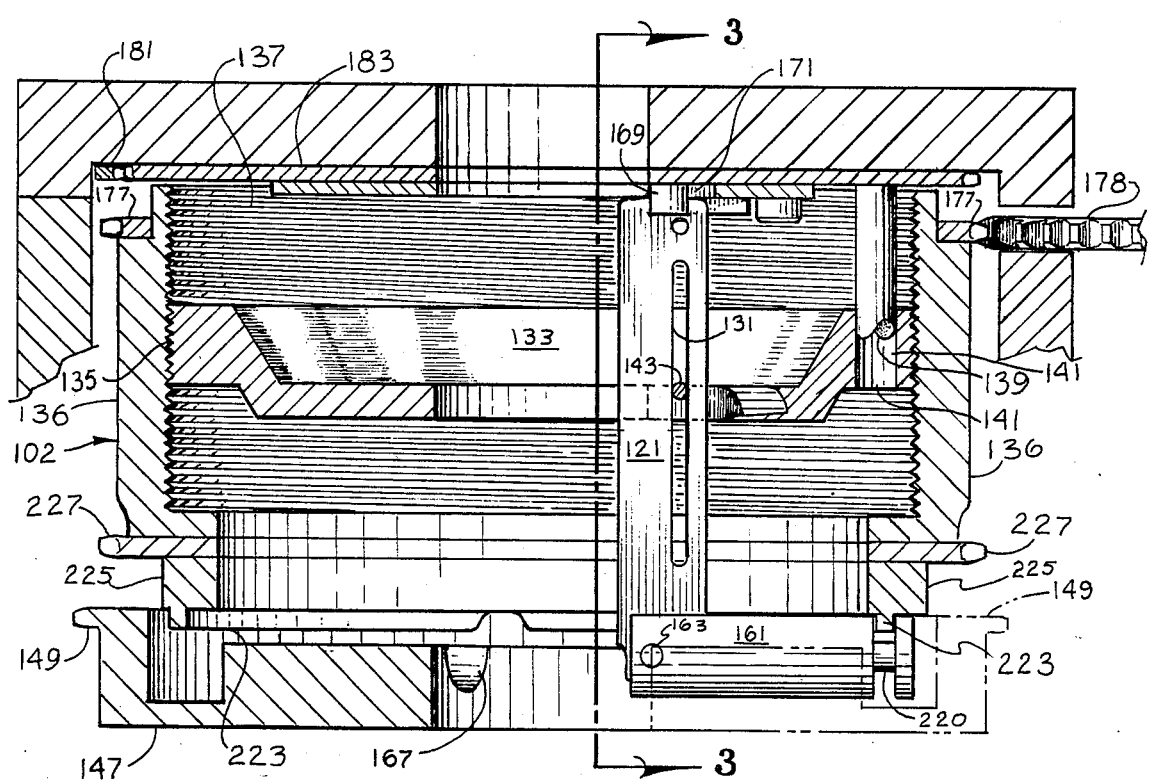
FIG. 2 is a vertical fragmentary sectional view of a portion of the apparatus of FIG. 1 with the fulcrum height adjustment mechanism.

Referring now to FIGS. 1 through 6, in FIG. 1 a laminations stack 101 is shown being inserted into an assembly nest 102; the laminations are retained by a pickup probe 107 having an operator 105 in the center thereof which is movable by means (not shown) to release the laminations 103 of lamination stack 101 where gravity and force of a spring 108 transfers them onto a retractable stud 109 mounted in a stud actuator 111.

Figure 3:
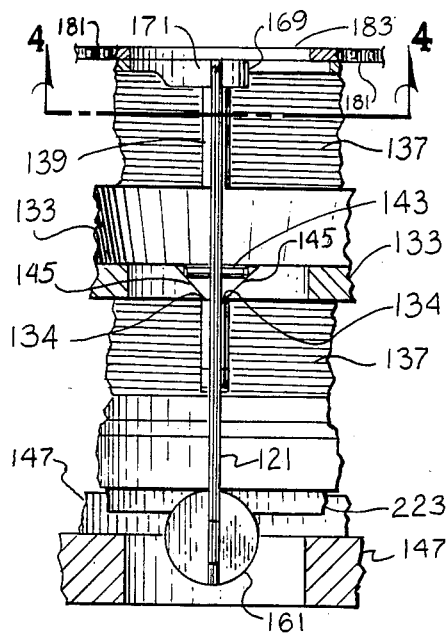
FIG. 3 is a vertical fragmentary sectional view of the apparatus of FIG. 2 viewed along line 3—3 in FIG. 2.
Figure 4:
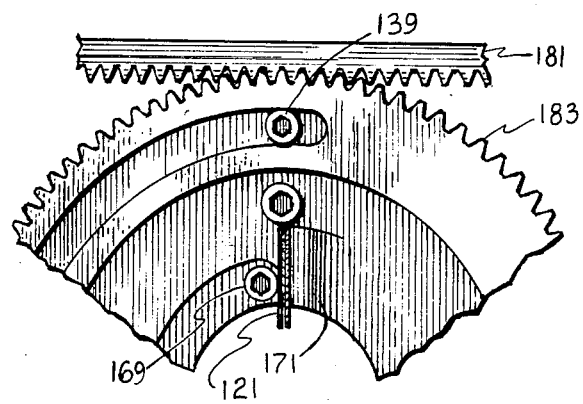
FIG. 4 is the bottom plan view of the blade clamping apparatus for clamping the top of the skew blade in vertical position.

On release of laminations 103 from probe 107 they will rest on the top of stud actuator 111 and will all be engaged by skew blade 121 which will initially be in a vertical position as seen in FIG. 3. Also seen in FIG. 2 and FIG. 3 the top of skew blade 121 is securely clamped to insure proper engagement of the slots 104 of laminations 103 with blade 121 which has previously been reset to the true vertical position by causing it to be clamped between reset peg 169 and reset stop 171. The clamping action is created by rotation of reset gear 183 through the movement of reset rack 181 shown in FIG. 4. Prior to setting the skew for laminations 103 the clamping action of reset stop 171 and of reset peg 169 is released by a contrary movement of rack 181 and gear 183, thereby permitting the top of blade 121 which is well above the top of lamination stack 101 to move freely as an angle is imparted to the blade.

Blade 121 is pivotally mounted to a plunger 161 by pin 163 having a pivot axis which is perpendicular to the plane of blade 121. Plunger 161 is cylindrical and mounted to a confirming cavity so that it is rotatable about an axis parallel to blade 121 and passing through the center of the laminations stack 101. The mid portion of the blade 121 is engaged by a fulcrum plate 133 which may be located from near the center of the blade 121 to near the top of blade 121 but in any case above the top of the lamination stack 101.

Points 134 of fulcrum plate 133 provide precise engagement with blade 121 while permitting substantial tilt of blade 121. In the explanation of FIG. 1 and the other figures it will be understood that while only one skew blade 121 with associated mechanism is being described, in fact there are three such blades and mechanisms equally spaced around assembly nest 102 of identical form and function. The orientation of blade 121 about pivot pin 163 is maintained by blade wire 143 which fits snuggly in blade slot 131.

At some time prior to the actual execution of the skew setting operation the fulcrum plate 133 will be set at the desired vertical distance above the axis of cylindrical plunger 161. In the embodiment described this distance controls the skew angle since the rotational displacement of plungers 161 and the bottom of skew blades 121 relative to the fulcrum points 134 is about 40° and is not variable.

Adjustment of the height of plate 133 is provided by fulcrum drive cylinder 136 having internal threads 137 which engage the external threads of fulcrum plate 133. Guide rod 139 permits fulcrum plate 133 to move vertically while restraining it from rotational motion about the vertical axis of the skew nest.

Figure 5:
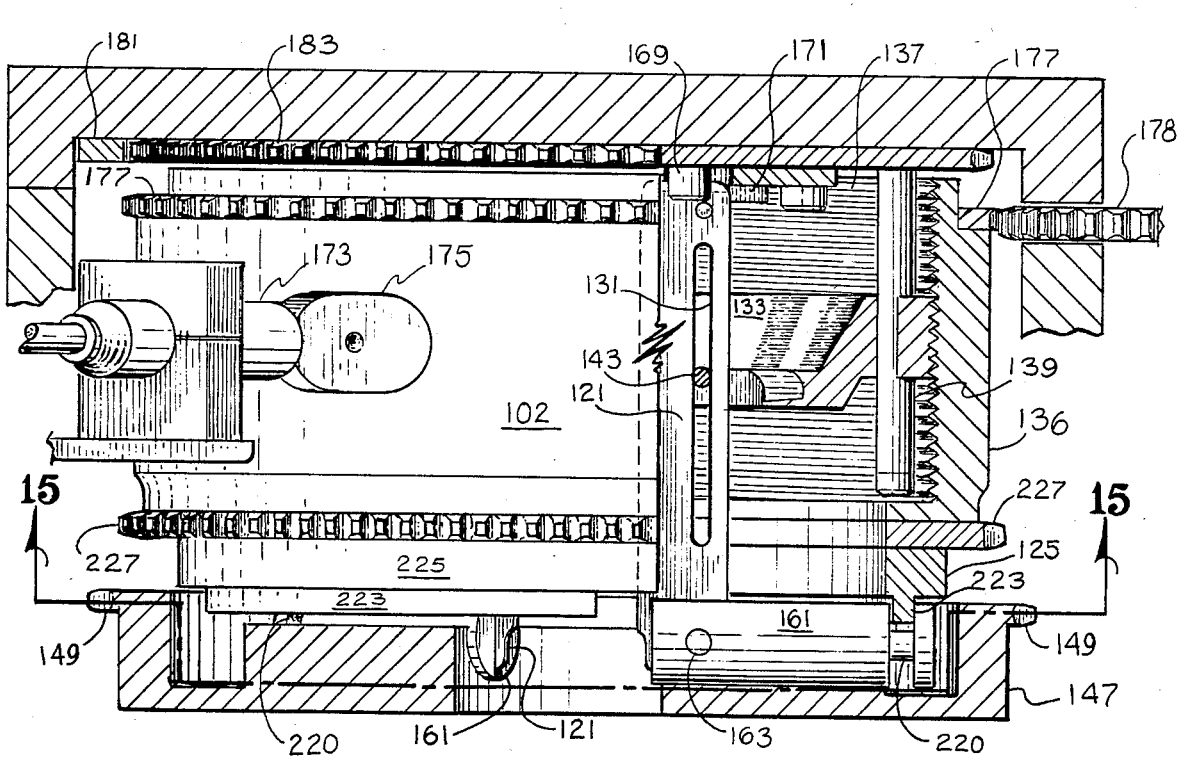
FIG. 5 is an elevational partially sectioned view of the assembly nest and skew setting apparatus exterior portion broken away to indicate the position of the skew blade.

A fulcrum drive motor (not shown) located in motor housing 179 has an output gear 178 which meshes with a fulcrum drive gear 177 on fulcrum drive cylinder 136 as seen in FIG. 5. Each assembly nest has its own independently controlled fulcrum drive mechanism thereby permitting rotors with different skews to be produced in parallel.

As the cylinder 136 is rotated in the clockwise or counterclockwise position its total rotations is measured by fulcrum drive sensor 173 which magnetically senses sensor index gaps 175 providing a digital signal to the computer control which is a direct measure of the vertical distance between fulcrum points 134 and the axis of plunger 161. The computer control is therefore capable of computing the skew angle as an inverse function of this distance. The skew angle (in radians) is approximately equal to the angular displacement of pivot pin 163 times its radius divided by the height of fulcrum points 134 above the axis of plunger 161.

With the fulcrum plate 133 set to the proper height to give the desired skew angle and with the laminations 103 in the bottom of the assembly nest the apparatus is conditioned to shift the laminations to produce the desired skew in the rotor assembly. This operation involves rotation of skew drive plate 147 by means of skew drive gear 149 which is engaged by skew drive rack 151, powered by fluid pressure cylinder 153. An arbitrary determination of the rotation of skew plate 147 in a clockwise direction provides a right handed skew in the rotor slots.

Figure 6:
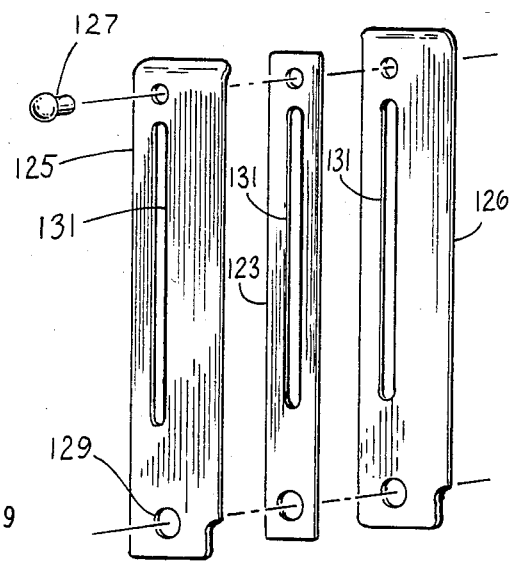
FIG. 6 is an exploded isometric view of a skew blade showing the composite construction of blades which are compressable to a narrower width.

When the skew is imparted to the laminations the formerly relatively smooth sides of the slots in the rotor are changed to a stair-step configuration because of the displacement of adjacent laminations. This stair-step effect produces a significant reduction in the clearance in the slot for the skew blade. The structure of the skew blades according to present invention has been especially adapted to accommodate this stair-step effect and maintain smooth operation of the apparatus as well as accurate determination of the respective displacements of adjacent laminations. As best seen in FIG. 6 skew blade 121 is formed of a first vane 125, a second vane 126 and a spacer 123 which are secured together at the top by a rivet 127 or other suitable means. Each component of the blade 121 is provided with a matching hole 129 which serves to accommodate blade pivot pin 163 of plunger 161. The blade slot 131 is placed in corresponding positions in spacer 123, vand 125 and vane 126. Spacer 123 does not extend to the edge (right edge in FIG. 6) of the blade 121 which engages slots of the laminations and vane 125 and 126 have sufficient resilience so that they will flex together under pressure thereby reducing the effective width of the blade by approximately one-third. This reduction of blade width occurs as the stair-step effect of the skewed laminations reduces the clearance in the rotor slot. Without becoming involved in the special terminology of rotor manufacture it may be said generally that the amount of skew possible with the apparatus of the invention is at least approximately 25° helix angle. It should be noted that the top portion of the blade above the top of the laminations (and above fulcrum plate 133) is unencumbered and free to move in the opposite direction of the movement of the bottom of the blade (and outward) it will in fact generally be outside the cylinder of the rotor laminations after the tilt has been imparted to produce the skew of the laminations. The function of the very top of the skew blade is to guide the laminations into the assembly nest and it will not remain in engagement with the lamination slots in the skew setting operation.

Figure 8:
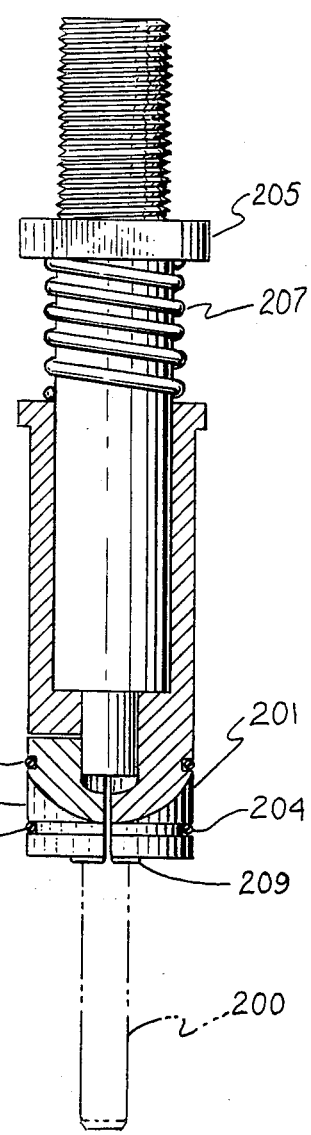
FIG. 8 is a vertical partially sectional view of the staking press head and dummy pin holder mechanism.
Figure 9:
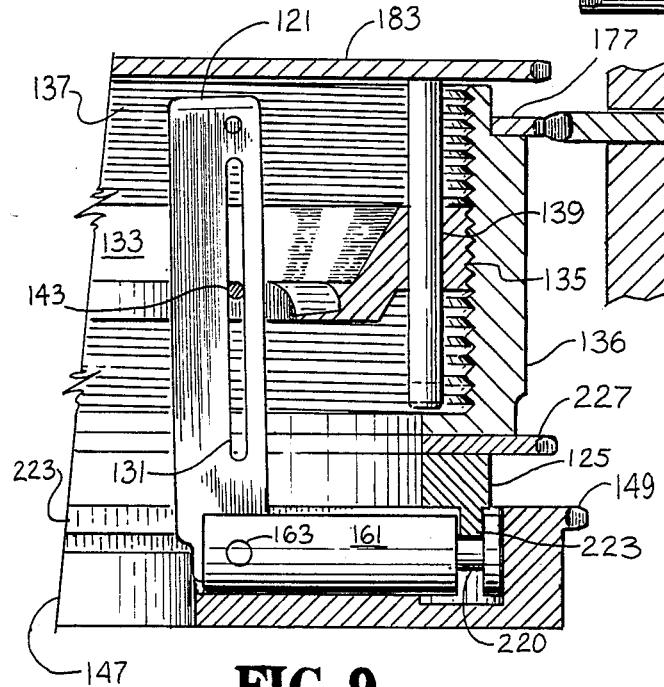
FIG. 9 is a fragmentary sectional view of the apparatus of FIG. 1 showing operation of the skew blade retraction mechanism.

While the blades are engaged with the slots of the laminations it is desired to secure the relative position of the laminations and this is accomplished in the present embodiment by placing a dummy pin through the central hole in the laminations and staking the top and bottom laminations to secure the assembly together temporarily. As the pickup probe 107 is shifted (to the left in FIG. 12) of the assembly nest to pickup another stack of laminations, stacking press 203 is moved in position over the assembly nest 102; as seen in FIG. 8 press head 205 includes a pin holder 201 which has at the bottom a cut out sector 202 held in place by elastomaric o-rings 204. This arrangement provides a frictional temporary engagement with dummy pin 200 (previously picked up from a pin feed mechanism 211 not forming part of the present invention).

Pin holder 201 is slidably mounted on press head 205 for limited vertical movement and is urged downwardly by spring 207. As press head 205 moves downward dummy pin 200 first starts to depress retractable stud 109 until it eventually replaces stud 109 in the center hole of laminations 101 and extends a short distance into stud actuator 111. Finally the laminations 101 are compressed between the bottom of press head 205 and the top of stud actuator 111.

There is a rim 209 around dummy pin 200 on the bottom of press head 205 and also a rim 112 around dummy pin 200 on the top of stud actuator 111 (see FIG. 1). Rims 112 and 209 serve to deform and stake the lower and upper laminations respectively thereby staking dummy pin 200 in the lamination stack 103 to temporarily maintain the configuration of the rotor laminations until they are permanently secured in a further operation.

Stud actuator 111 is also provided with a cut out sector 114 held in position by o-rings 113 in a manner to grasp the lower end of dummy pin 200. When press head 205 is lifted after the staking operation dummy pin 200 is held by lamination stack 101 which is in turn held in the assembly nest by blade 121 and stud actuator 111 so that dummy pin 200 slips out of the grip of cut out sector 202.

Figure 7:
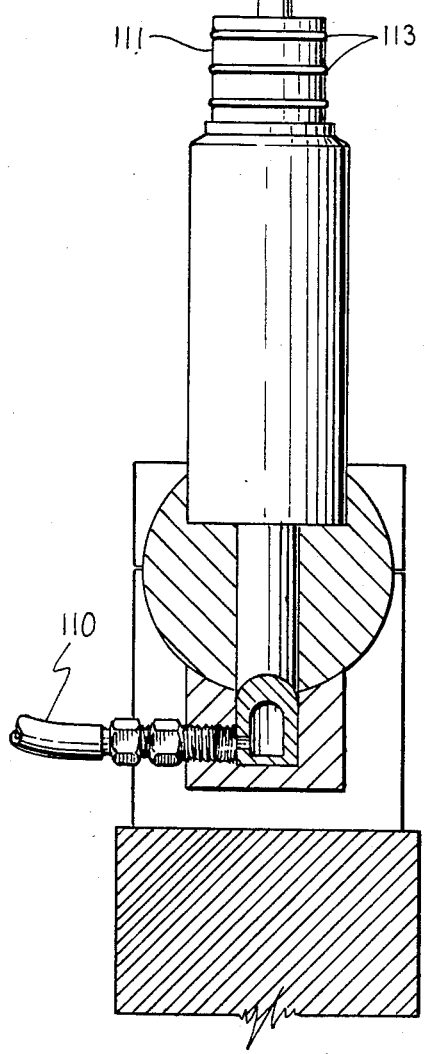
FIG. 7 is a vertical partially sectional fragmentary view of the retractable stud actuator and rotor ejector mechanism.
Figure 10:
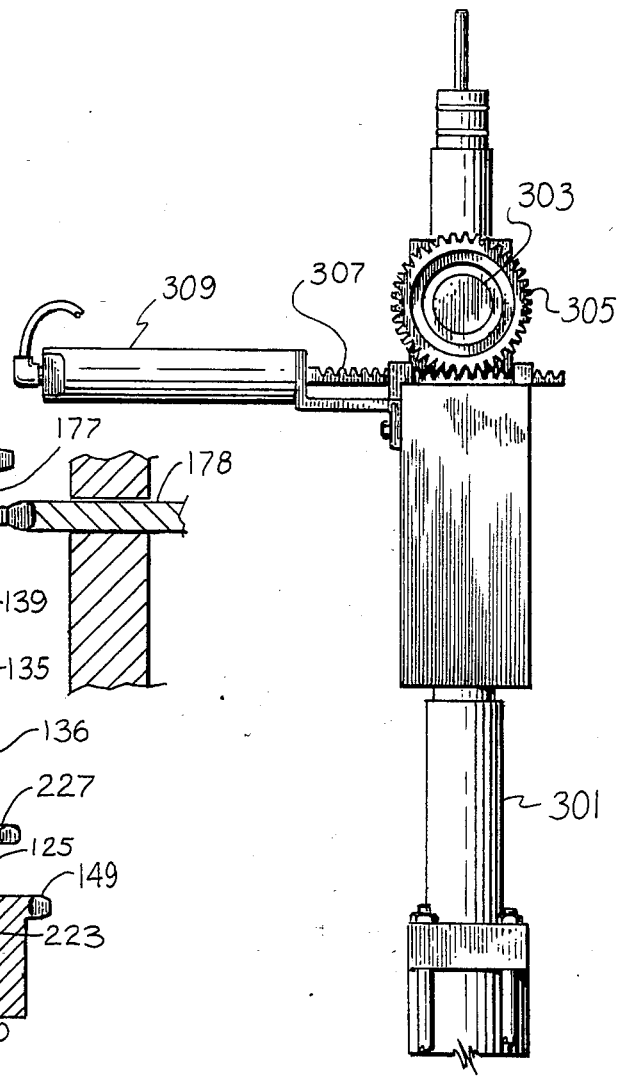
FIG. 10 is a vertical fragmentary sectional view of the rotor release and ejection apparatus.
Figure 11:
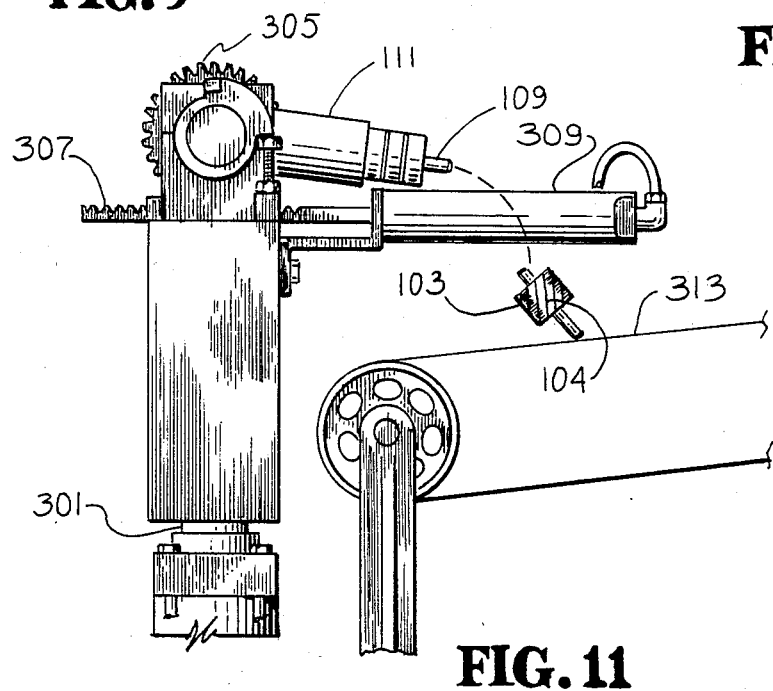
FIG. 11 shows the apparatus of FIG. 10 in operation to eject an assembled rotor.
Figure 14:
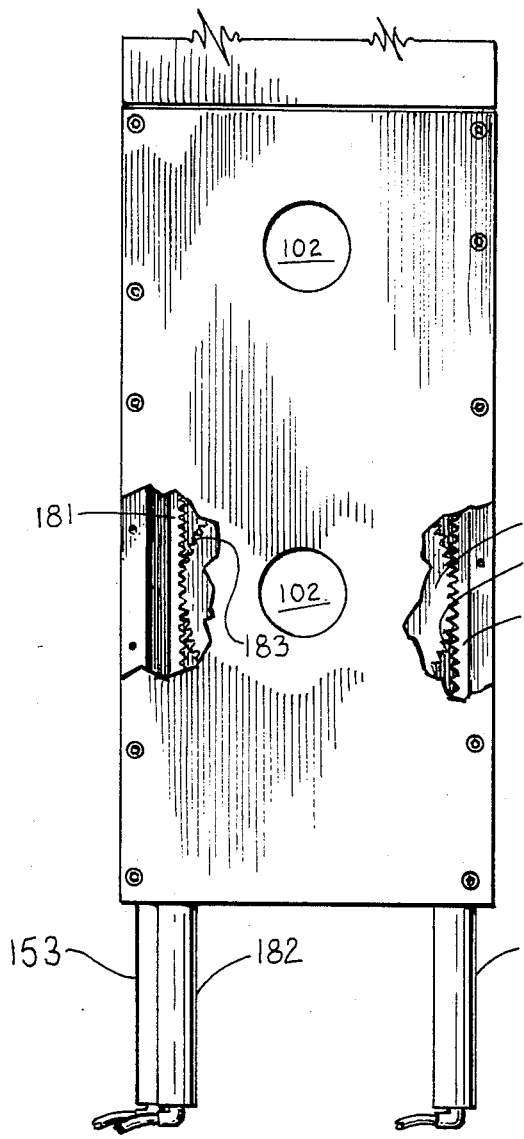
FIG. 14 is a plan view of the apparatus taken along the line 14—14 in FIG. 13 partially broken away to show rack and pinion actuating mechanisms for the assembly nest.
Figure 15:
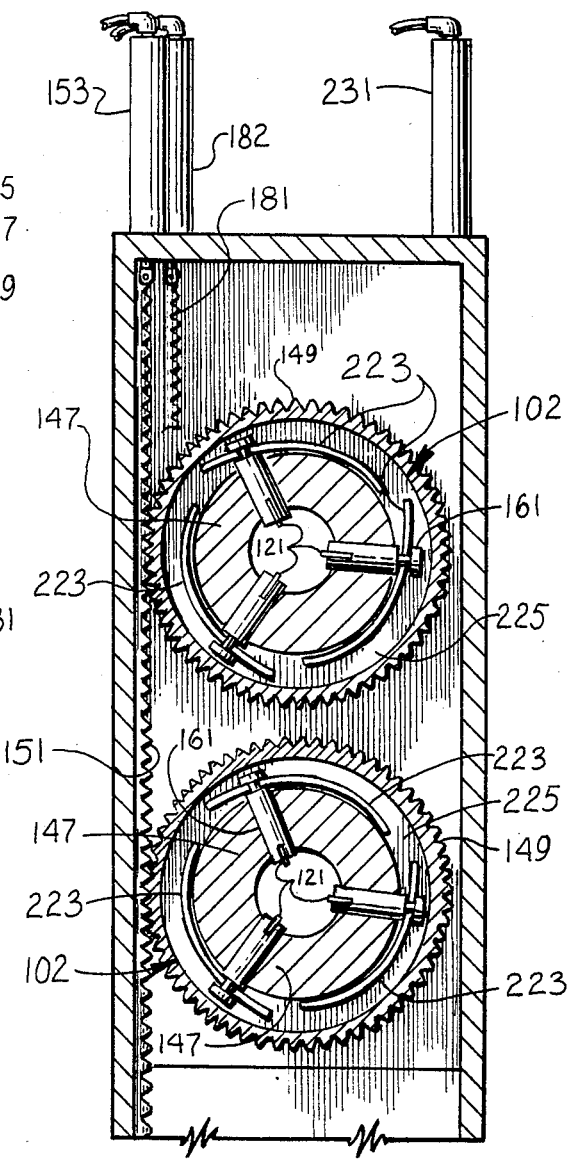
FIG. 15 is a fragmentary sectional view taken along line 15—15 in FIG. 5.

In the present preferred embodiment the assembled rotor is unloaded from the bottom of the assembly nest and this operation is commenced by outward radial movement of plunger 161. Plunger 161 has a groove 220 which engages a spiral camming land 223 (see FIG. 15). Land 223 is formed integrally with release drive plate 225 having associated therewith the release drive gear 227, which engages release rack 229 operated by fluid pressure cylinder 231 (see FIG. 14). Land 223 has a circular dwell portion which prevents radial motion of plungers 161 in the course of the previously described rotation of skew setting. Rotation of gear 227, plate 225 and spiral camming land 223 causes plunger 161 to move radially outward pulling blade 121 out of the slots in lamination stack 103. At the same time the tops of blades 121 will move together to the center of the skew nest. Because fulcrum points 134 are substantially above the top of lamination stack 101 the blade 121 will be completely withdrawn from the slots of stack 101 and stack 101 will be free to move out to the bottom of the assembly nest. Referring to FIGS. 7, 10 and 11, release and ejection mechanism 200 operates by lowering stud actuator 111 by means of fluid pressure cylinder mechanism 301, whereupon mounting shaft 303 having gear 305 secured thereto is rotated by means of rack 307 operated by fluid pressure cylinder 309 as shown in FIG. 11.

An increase in air pressure provided through hose 110 (shown in FIG. 7) is then communicated to the face of stud 109 which rises and forces dummy pin 200 out of the frictional grip of cut out sector 114. An assembled rotor lamination stack and dummy pin 200 is thereby ejected from the stud actuator 111 onto a conventional conveyor as shown at 313 for transport to a storage container or to a succeeding workstation. After a short interval the stud actuator 111 is returned to vertical by reversal of the foregoing operation and the rotor assembly apparatus is conditioned to receive another stack of rotor laminations in the assembly nest.

It should be appreciated that while a single station for a rotor assembly apparatus has been described it will be more common for such apparatus to include multiple stations up to four or more which operate in parallel to produce up to four assembled rotor lamination stacks in each cycle. Also, as previously mentioned, the specifications and characteristics of the rotors being produced at each station need not be identical and the lamination stack can have different skew angles and different heights of lamination stack thereby providing great flexibility in producing components to meet the current manufacturing requirements. As to skew angle and lamination height the apparatus can be changed on stream without the necessity of making mechanical adjustments to the equipment by hand. Accordingly the computer control for the apparatus can be programmed to make rotor lamination stack assemblies in a prescribed sequence at each of the several stations of the machine and this can be done without personal attention of the operator. Certain other adjustments such as size of the central rotor opening or of the rotor itself would require a change in the setup of the machine or of the parts feed to the machine or both but even where setup changes are required they may be done very quickly. Also the different stations of the machine can have different setups and the computer can in such case determine the setup and the resulting product characteristics by selecting which of the stations is to be used to assemble the rotor lamination stack. A frequent problem with skew setting mechanisms is excessive wear and frequent replacement of blades (or pins) used for skewing the lamination stack and the present invention is notably effective in reducing the wear on the skew blade so that they need be replaced very infrequently. At the same time blade replacement is very simple due to the accessability of the interior of the assembly nest and of the skew blades. Thus when skew blade replacement is required it may be done with a minimum of down time for the machine.

In addition to the modifications and variations of the apparatus which have been described or suggested it will be apparent to those of ordinary skill in the art that other modifications and variations may be made within the scope of the invention. Accordingly the scope of the invention is not to be construed to be limited to the particular embodiments of the invention shown, described or suggested, but is rather to be determined by reference to the appended claims.

What is claimed is:

1. In an automated rotor laminations assembly apparatus for circular peripherally slotted laminations with a central opening, a skew setting combination comprising
    an assembly nest having a generally cylindrical vertical axis cavity of greater horizontal dimensions than said laminations and a depth sufficient to accept a stack of from 10 to 100 of said laminations,
    a central stud in said cavity for engaging an opening in each of said laminations, at least one elongated generally vertically extending skew blade with a planar surface and having its lower end pivotally secured to a plunger mounted for axial motion substantially along a diameter of said cavity, the pivot axis of said skew blade being perpendicular to the plane of said surface, said plunger also being rotatable about an axis corresponding to said diameter of said cavity, a fulcrum plate at a position spaced a controllable distance above the pivot axis of said blade having an opening for engaging the thickness of said blade, means for setting the vertical position of said fulcrum plate, means for placing a stack of laminations in said cavity with slots in said laminations engaged by said blade in vertical orientation, means for partially restraining said blade near its upper end to maintain alignment with said slots, means for rotating said plunger about the vertical axis of said cavity to cause said blade to be non-parallel with said axis and thereby impart a skew to said stack of laminations, means for securing the laminations of said stack against relative movement, and means for moving said plunger away from said cavity vertical axis to withdraw said blade from said slots, whereby a skew angle is imparted to the stack of laminations which is a function of the controllable vertical distance between said fulcrum plate and the horizontal rotation axis of said plunger.

2. Apparatus as recited in claim 1 wherein said means for securing laminations of said stack against relative movement comprises means for inserting and securing a pin in the central openings of said laminations.

3. Apparatus as recited in claim 1 wherein said skew blade comprises a pair of spaced apart sheets of resilient material capable of flexing together to reduce the effective thickness of said blade.

4. Apparatus as recited in claim 1 wherein said means for placing a stack of laminations in said cavity comprises an elongated cylindrical element fitting snugly in a central opening in said laminations and adapted to guide said laminations onto said central stud in said cavity.

5. Apparatus as recited in claim 1 wherein said fulcrum plate is internally threadedly mounted in a rotatable cylinder and is vertically movable by rotation of said cylinder.

6. Apparatus as recited in claim 1 wherein said means for moving said plunger comprises a spiral camming element and said plunger includes a follower engaging said spiral camming element.

7. Apparatus as recited in claim 1 further including means for withdrawing said stack of laminations out of the bottom of said cavity.

8. In an automated magnetic core laminations assembly apparatus, a skew setting combination comprising an assembly nest having a generally cylindrical vertical axis cavity depth sufficient to accept a stack of at least 10 of said laminations, at least one elongated generally vertically extending skew blade with generally parallel planar surfaces and having its lower end pivotally secured to a plunger mounted for horizontal motion relative to said cavity, the pivotal axis of said skew blade being perpendicular to the planes of said surfaces, said plunger also being rotatable about its horizontal axis, a fulcrum element having an opening for engaging the thickness of said blade at a position spaced from the pivot axis of said blade, means for rotationally relatively displacing said plunger and fulcrum plate to cause said skew blade to be non-parallel with the axis of said cavity and thereby impart a skew to said stack of laminations, means for securing the laminations of said stack against relative movement, and means for moving said plunger away from said cavity vertical axis to withdraw said blade from said slots.

9. Apparatus as recited in claim 8 further including means for setting the vertical position of said fulcrum plate.

10. Apparatus as recited in claim 8 further including a central stud in said cavity for engaging an opening in each of said laminations.

11. Apparatus as recited in claim 8 further including means for placing a stack of laminations in said cavity with slots in said laminations engaged by said blade in vertical orientation.

12. Apparatus as recited in claim 8 further including means for partially restraining said blade near its upper end to maintain alignment with said slots.

13. Apparatus as recited in claim 8 wherein said means for securing laminations of said stack against relative movement comprises means for inserting and securing a pin in the central openings of said laminations.

14. Apparatus as recited in claim 8 wherein said skew blade comprises a pair of spaced apart sheets of resilient material capable of flexing together to reduce the effective thickness of said blade.

15. Apparatus as recited in claim 11 wherein said means for placing a stack of laminations in said cavity comprises an elongated cylindrical element fitting snugly in a central opening in said laminations and adapted to guide said laminations onto said central stud in said cavity.

16. Apparatus as recited in claim 8 wherein said fulcrum element is internally threadedly mounted in a rotatable cylinder and is vertically movable by rotation of said cylinder.

17. In an automated rotor laminations assembly apparatus for slotted laminations, a skew setting combination comprising, an assembly nest having a generally cylindrical vertical axis cavity with depth sufficient to accept a stack of at least 10 of said laminations, means in said cavity for engaging said laminations with freedom of individual rotational movement about a vertical axis, at least one generally planar skew blade with an edge extending toward the center of said cavity to engage said slots having its end pivotally secured to a pivot element with a first pivot axis perpendicular to the plane of said blade and a second pivot axis horizontally extending approximately through the center of said cavity, a vertically movable fulcrum having means for engaging said blade at a position intermediate of its ends and spaced a controllable vertical distance from said second pivot axis, means for rotating said pivot element through a predetermined angle about the vertical axis of said cavity to cause said skew blade to shift from a vertical to non-vertical position and thereby impart a skew to the slots of said stack of laminations, whereby a skew angle is imparted to the stack of laminations which is a function of the controllable vertical distance between said fulcrum plate and said second pivot axis of said pivot element.

18. Apparatus as recited in claim 17 wherein said means in said cavity for engaging said laminations includes a central stud in said cavity for engaging an opening in each of said laminations.

19. Apparatus as recited in claim 17 further including means for setting the vertical position of said fulcrum plate and means for placing a stack of laminations in said cavity with slots in said laminations engaged by said blade in vertical orientation.

20. Apparatus as recited in claim 17 wherein said skew blade comprises a pair of spaced apart sheets of resilient material capable of flexing together to reduce the effective thickness of said blade.

* * * * *